Figure 1:
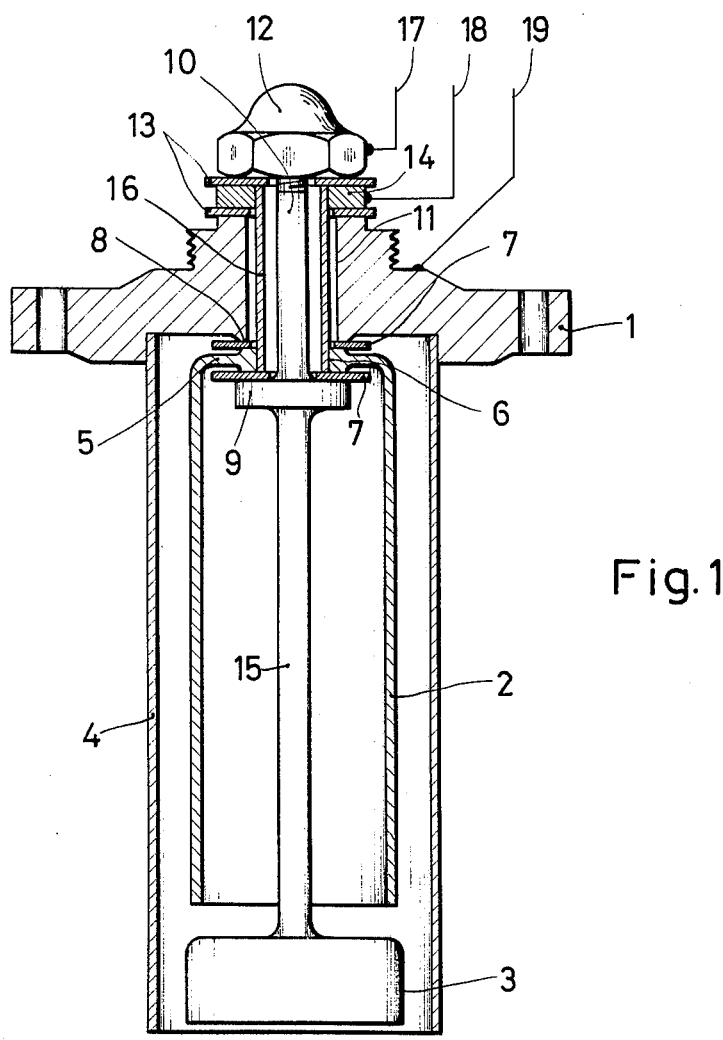

United States Patent [19]

Zimmermann

[11] 4,027,534

[45] June 7, 1977

[54] ELECTRODE DEVICE FOR MONITORING LIQUID LEVELS

[75] Inventor: Heino Zimmermann, Bremen, Germany

[73] Assignee: Gustav F. Gerdts KG, Bremen, Germany

[22] Filed: Jan. 5, 1976

[21] Appl. No.: 646,699

[52] U.S. Cl. .............................. 73/304 R; 324/65 P
[51] Int. Cl.² ........................................ G01F 23/24
[58] Field of Search ............. 73/304 R, 304 C, 313; 340/244 C; 324/65 R, 65 P

[56] References Cited

UNITED STATES PATENTS

| | | | |
|---|---|---|---|
| 2,551,983 | 5/1951 | Wagner ............................ | 73/304 R |
| 3,339,411 | 9/1967 | Riffie ................................ | 73/304 R |
| 3,504,205 | 3/1970 | Sheckler ......................... | 73/304 R X |
| 3,555,533 | 1/1971 | Edelman ........................ | 73/304 R X |
| 3,910,118 | 10/1975 | Schittek et al. .................. | 73/304 R |

FOREIGN PATENTS OR APPLICATIONS 1,021,110  2/1966  United Kingdom ........... 340/244 C

*Primary Examiner*—Richard C. Queisser
*Assistant Examiner*—Joseph W. Roskos
*Attorney, Agent, or Firm*—Allison C. Collard

[57] ABSTRACT

An electrode device for use in monitoring conductive liquids consisting of a mounting with a first electrode having a tie rod portion disposed through the central opening of the mounting and a clamping collar secured to the tie rod adjacent to one side of the mounting. The first electrode then extends further in an extending portion and is surrounded coaxially by a second tubular electrode which is connected through a contact sleeve disposed in the central opening of the mounting. There is also a counterelectrode coaxially surrounding the second electrode and secured to the mounting surface. The second electrode has an end flange portion with a passageway for receiving the rod portion of the first electrode. The clamping nut secures the rod portion of the first electrode and the end flange between insulating washers to the mounting. In another embodiment, the rod and extending end portion are detachable and the end of the first electrode has a cylindrical sleeve which is springloaded to the end of the extending portion.

10 Claims, 2 Drawing Figures

ELECTRODE DEVICE FOR MONITORING LIQUID LEVELS

This invention relates to an electrode device for monitoring an electrically conductive liquid.

More specifically, the invention relates to an electrode that is connected to electrical means for monitoring the level of a liquid. The device comprises a mounting, a tubular first electrode, a second electrode axially spaced from the first electrode and further from the mounting than the first electrode, and electrical connection means extending through the first electrode to the second electrode.

In a known gauge electrode device of the kind defined, (German Patent Specification No. 700,099) there are several electrodes stacked one above the other and consisting of tube pieces or sleeves. The requisite insulation is effected by interposition of insulating washers, and the requisite seal at the insulation points is achieved through a central tie rod. This device has shown inself to be suitable for high working pressures and temperatures. Difficulties arise in the case of great electrode lengths, which may be necessary for gauges for continuous level measurement - where the lower electrode serves for the compensation of fluctuations of conductivity of the liquid, while the actual measuring electrode is provided lying thereabove. However, in this device, great electrode lengths necessitate long tie rods, which may be subject to twisting and bending movements during tightening. In these circumstances, a reliable seal at the insulation points cannot always be ensured.

Therefore, the present invention provides a device which can be suitable for high working pressures and temperatures and in which the position of the insulation points in relation to the mounting is independent of the length of the tubular electrode so that great electrode lengths are possible without danger to the sealing at the insulation points.

According to the invention, the tubular electrode has at its end nearest to the mounting, an end flange which is held firmly and tightly clamped. Electrically insulated washers are interposed between an annular clamping surface of the mounting the mounting and a clamping collar of a tie rod which penetrates in an electrically insulated manner through the end flange and through the mounting. The tie rod has an extension of rod form which constitutes the electrical connection means extending through the tubular electrode. There is left an annular space between the tubular electrode and the extension, the latter carrying the second electrode on an end of the extension protruding from the tubular electrode. Thus the insulation points of the electrodes may both lie in the immediate vicinity of the mounting.

An insulated washer for the lower electrode may be spaced from the mounting only by the thickness of the end flange of the tubular upper electrode. The thickness of the end flange can almost always be the same in spite of different electrode lengths, for which also the length of the tie rod can be short and also always the same. The insulation of the electrodes from one another and from the housing can guarantee a reliable seal where electric connection means for the electrodes protrude from the mounting.

The tubular electrode may be detachably connected to its end flange, and the extension of the tie rod may be detachably connected to the tie rod. This is advantageous because the mounting, the tubular electrode end wall, the tie rod, and the insulating washers can form a standard construction group which can be assembled independently of the electrodes. This construction group can then be tested for example for liquid tightness of the insulations and then kept in stock ready for use. Then, in case of need, it is necessary only to fit electrodes and an extension of the tie rod of suitable lengths in each case. Thus, there is no need for interference with the insulations.

If the extension is surrounded by an insulating jacket, it is possible to reduce or obviate current flux between the extension and the surrounding tubular electrode. Thus the total electric loading of the measurement circuit to be attached to the device, such as, for example, a bridge circuit, can be kept small. A liquid-tight insulation is not necessary since the current flux has no influence upon the actual measurement result. The insulating jacket can be made inexpensively with wide tolerances, with radial or axial play on the extension.

Other objects and features of the invention will become apparent from the following detailed description when taken in connection with the accompanying drawings which disclose several embodiments of the invention. It is to be understood that the drawings are designed for the purposes of illustration only, and are not intended as a definition of the limits and scope of the invention.

Figure 2:
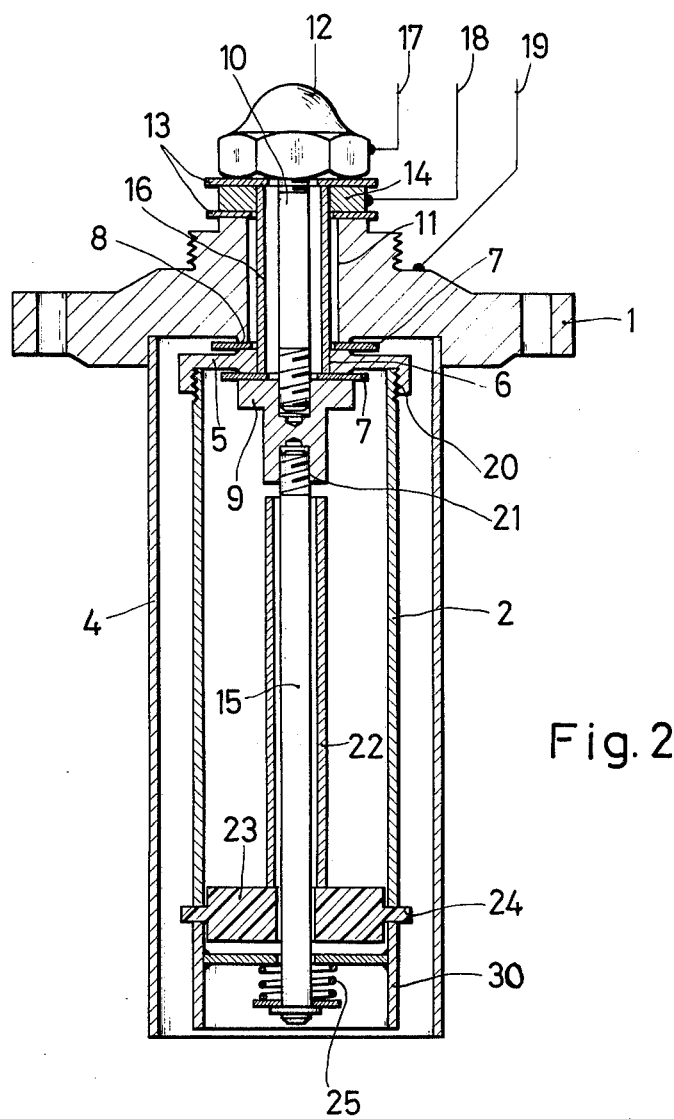

In the drawings, wherein similar reference numerals denote similar elements throughout the several views:

FIG. 1 is a cross sectional view of the device in accordance with the invention; and FIG. 2 shows a modified embodiment of the device of FIG. 1.

The device of FIG. 1 can provide continuous level measurement, and comprises a mounting 1 in the form of a flange, and two electrodes 2 and 3, arranged coaxially one above the other and surrounded by a common co-axial counter-electrode 4.

Upper electrode 2 is of tubular formation and has at its upper end, an end flange 5 with a passage 6. Insulating washers 7 are provided on both sides of end flange 5, which insulation washers 7 are clamped firmly and liquid-tight between an annular clamping surface 8 of mounting 1 and a clamping collar 9 of a tie rod 10. Tie rod 10 passes through passage 6 of flange 5, and a passage 11 of mounting 1. On tie rod 10 is a clamping nut 12 which bears through insulating washers 13 and a contact ring 14 on the outside of mounting 1. Tie rod 10 is insulated by insulating washers 7 and 8 both from electrode 2 and from mounting 1, and it is used additionally as an electrical conductor for lower electrode 3. Tie rod 10 is provided with an extension 15 of rod form extensing from clamping collar 9. Extension 15 extends axially freely through tubular electrode 2 and carries electrode 3 beneath electrode 2.

The electrical connection to electrode 3 is through tie rod 10. Electrode 2 is electrically connected at the exterior through a contact ring 14, which is connected electrically with end flange 5 through a contact sleeve 16. Electrodes 2, 3 and 4 have respective electrical connection leads 17, 18 and 19.

Despite the length of electrode 2, or long distance of electrode 3 from mounting 1, the length of the part of tie rod 10 subject to axial stress is relatively short, and this allows a secure seal to be obtained on insulating washers 7.

In the device of FIG. 2, electrode 2 is detachably connected to its end flange 5 by means of a screw thread 20, and extension 15 is detachably connected through a screw thread 21 to clamping collar 9, which is screwed on to tie rod 10. Thus, flange 5 and tie rod 10 with collar 9 and the insulating and contact parts 7, 13, 14 and 16 can be assembled completely with mounting 1 to form a standard construction group. Electrodes 2, 30 and 4 and extension 15 can be added at any time, and can be of lengths to suit the individual case of utilization.

Moreover, extension 15 is surrounded by an insulating jacket 22 which reduces the current flux between extension 15 and electrode 2, and thus reduces the current comsumption of a measurement circuit (not shown) attached to the device. The above mentioned current flux has no influence upon the measurement result, since this is determined by using the respective resistance values between electrodes 2 and 4 and between electrodes 30 and 4. For economy in manufacture, an accurately-fitting insulating jacket 22 is unnecessary since a sleeve is used which surrounds extension 15 with axial and radial play, permitting tolerances which facilitate manufacture.

The jacket 22 rests on an insulator ring 23 which effects centering of electrodes 2 and 30 and extension 15. Ring 23 has a collar 24 which serves as axial distance member between electrodes 2 and 30. Electrode 30 is held in its installed position by a spring 25, which constitutes an electrically conductive connection and bears on an aboutment on extension 15.

While only two embodiments of the present invention have been shown and described, it will be obvious to those skilled in the art that many changes and modifications may be made thereunto without departing from the spirit and scope of the invention.

What is claimed is:

1. An electrode device for use in monitoring conductive liquids comprising:

a mounting having a central opening;

a first electrode having a tie rod portion disposed through the central opening of said mounting and insulated therefrom;

a clamping collar secured to said tie rod adjacent to one side of said mounting, said first electrode including an extending end portion connected to the clamping collar;

a second electrode in the form of a tubular sleeve coaxially surrounding said first electrode and insulated therefrom, said second electrode including an end flange at one end, and having a central opening surrounding said first electrode between its collar and said one side of said mounting, the opposite end of said second electrode being open to permit the free end of said extending end portion of said first electrode to extend from said opening;

a counter electrode in the form of a tubular sleeve and coaxially surrounding said first and second electrodes, said counter electrode having one end secured and electrically connected to said mounting;

a pair of insulated washers disposed on each side of the end flange of said second electrode coaxial to its central opening for insulating said second electrode from said mounting and the clamping collar of said first electrode;

a contact sleeve disposed through the central opening of said mounting and coaxially surrounding the rod portion of said first electrode, said sleeve disposed through one of said washer pair and supported on a second of said washer pair adjacent said clamping collar, said contact sleeve being disposed through the central opening and electrically secured to the end flange of said second electrode; and means engaging one end of said tie rod portion for securing said first electrode to the opposite side of said mounting and for securing the end flange of said second electrode and its washer pair between said side of said mounting and said clamping collar.

2. The device according to claim 1 wherein said second electrode is detachably connected to its end flange.

3. The device according to claim 1 wherein said extending end portion is detachably connected to said tie rod.

4. The device according to claim 1 comprising an insulating jacket coaxially surrounding the extending end portion of said first electrode.

5. The device according to claim 4 wherein said insulating jacket is disposed with radial and axial play on said extending portion.

6. The device according to claim 1 comprising at least one insulating ring disposed on the free end of said extending portion, and having at least one peripheral surface for centering at least said second electrode.

7. The device according to claim 6 wherein said insulating ring is disposed at the end portion of said second electrode and includes a collar which extends as an axial distance member between respective end surfaces of said second electrode and the extending end portion of said first electrode.

8. The device according to claim 7 wherein the extending end portion of said first electrode is axially displaceable, and comprising a spring for loading said first electrode in the direction towards said second electrode, said spring being secured on the end of said extending end portion.

9. The device according to claim 1 wherein said tie rod, said extending end portion, said second electrode and said first electrode are all coaxial with each other.

10. The device according to claim 1 wherein said engaging means comprises a nut threadably engaged to the end of said tie rod portion, a second pair of insulated washers surrounding said rod portion and disposed between said nut and the opposite surface of said mounting, and a contact ring coaxially mounted with respect to said rod portion and electrically connected to said contact sleeve and disposed between said washer pair.

* * * * *